US012792742B2

(12) United States Patent
Pettel et al.

(10) Patent No.: US 12,792,742 B2
(45) Date of Patent: Nov. 10, 2026

(54) SYSTEM AND METHOD FOR EVALUATING RISK ASSOCIATED WITH NETWORK ASSETS

(71) Applicant: Honeywell International Inc., Charlotte, NC (US)

(72) Inventors: Noam Pettel, Kochav Yair (IL); Nicole Ginsberg, Ramat Gan (IL); Moshe Raab, Sde Varburg (IL)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 26 days.

(21) Appl. No.: 18/896,931

(22) Filed: Sep. 26, 2024

(65) Prior Publication Data

US 2025/0384144 A1 Dec. 18, 2025

Related U.S. Application Data

(60) Provisional application No. 63/658,875, filed on Jun. 12, 2024.

(51) Int. Cl.
*G06F 21/57* (2013.01)
*G06F 21/55* (2013.01)

(52) U.S. Cl.
CPC .......... *G06F 21/577* (2013.01); *G06F 21/554* (2013.01)

(58) Field of Classification Search
CPC ............................ G06F 21/577; G06F 21/554
USPC ........................................................ 726/25
See application file for complete search history.

(56) References Cited

U.S. PATENT DOCUMENTS

| | | | | |
|---|---|---|---|---|
| 8,515,783 | B1 * | 8/2013 | Weeks | G06Q 10/0635 705/4 |
| 12,244,635 | B1 * | 3/2025 | Bonfield | H04L 63/1433 |
| 12,244,636 | B1 * | 3/2025 | Anand | H04L 63/1433 |
| 2025/0280027 | A1 * | 9/2025 | Mignot | H04L 63/1433 |

* cited by examiner

*Primary Examiner* — Zi Ye
(74) *Attorney, Agent, or Firm* — ALSTON & BIRD LLP

(57) ABSTRACT

The present disclosure discloses a system and a method for evaluating the risk associated with network assets. More particularly, the present disclosure provides the system and method for evaluating risk associated with network assets based on risk scoring. The disclosed methodology calculates a singular risk score for each network asset. Further, the singular risk score for each network asset is displayed on a web user interface (UI) page to facilitate the user to quickly and efficiently monitor the security status of the network assets without a need for extensive training or technical expertise.

18 Claims, 12 Drawing Sheets

100A

601

801

1000

SYSTEM AND METHOD FOR EVALUATING RISK ASSOCIATED WITH NETWORK ASSETS

FIELD OF INVENTION

The present disclosure generally relates to a system and a method for evaluating risk associated with network assets. More particularly, the present disclosure discloses the system and method for evaluating risk associated with network assets based on risk scoring.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

With the increase in digitization, cybersecurity is an essential aspect of modern business operations and data protection. The increasing interconnectedness of infrastructures and the rise of sophisticated cyber threats necessitates a comprehensive approach to safeguard network assets connected in a network. Thus, the demand for enhanced cybersecurity measures is inevitable.

Currently, various solutions are implemented to safeguard the network assets. However, current cybersecurity systems face several drawbacks that hinder their efficacy given the complex nature of the system. As the network assets are interconnected with each other, it is challenging to detect the vulnerability in the network asset and prioritize the network assets accordingly. This can be overcome by conducting a risk assessment. However, conducting the risk assessment involves a systematic and granular approach to identify, analyze, and mitigate potential threats to the network assets. Further, a technical expert may be required for the risk assessment of the network assets, who is required to undergo extensive training for analysis.

Thus, there is a need to provide a comprehensive approach for evaluating risk associated with network assets.

Through applied effort, ingenuity, and innovation, the inventors have solved and proposed the above problem(s) by developing the solutions embodied in the present disclosure, the details of which are described further herein.

SUMMARY OF THE INVENTION

In general, embodiments of the present disclosure herein provide a solution for evaluating the risk associated with network assets. Other implementations will be or will become, apparent to one with skill in the art upon examination of the following figures and detailed description. It is intended that all such additional implementations be included within this description within the scope of the disclosure.

According to an embodiment of the present disclosure, a method for evaluating risk associated with one or more network assets is disclosed. In an embodiment, the method comprises receiving data associated with the one or more network assets. The data includes at least one of one or more risk identifiers for identifying a plurality of risk parameters associated with each network asset among the one or more network assets and one or more risk metrics associated with the one or more risk identifiers. Further, the one or more risk metrics indicate severity levels in the each network asset with respect to each of the plurality of risk parameters. The method further comprises determining, corresponding to each of the severity levels in each of the plurality of risk parameters, a severity score for the each network asset based on the risk metric and a severity weightage preassigned corresponding to each of the severity levels. In an embodiment, the severity score is determined for each of the plurality of risk parameters for the one or more network assets. The method further comprises calculating a risk score for the each network asset with respect to each of the plurality of risk parameters based on a summation of the severity score of each of the plurality of risk parameters. Further, the method comprises calculating a total risk score for the each network asset based on a risk weightage preassigned corresponding to each of the plurality of risk parameters and a summation of the risk score with respect to each of the plurality of risk parameters for the each network asset. The method further comprises evaluating the risk associated with the each network asset based on the total risk score for the each network asset.

According to an embodiment of the present disclosure, a system for evaluating risk associated with one or more network assets is disclosed. In an embodiment, the system comprises one or more processors, a memory, and one or more programs stored in the memory. The one or more programs when executed by the one or more processors cause the one or more processors to receive data associated with the one or more network assets. The data includes at least one of one or more risk identifiers for identifying a plurality of risk parameters associated with each network asset among the one or more network assets and one or more risk metrics associated with the one or more risk identifiers. Further, the one or more risk metrics indicate severity levels in the each network asset with respect to each of the plurality of risk parameters. The one or more processors are further configured to determine, corresponding to each of the severity levels in each of the plurality of risk parameters, a severity score for the each network asset based on the risk metric and a severity weightage preassigned corresponding to each of the severity levels. The severity score is determined for each of the plurality of risk parameters for the one or more network assets. The one or more processors are further configured to calculate a risk score for the each network asset with respect to each of the plurality of risk parameters based on a summation of the severity score of each of the plurality of risk parameters. Further, the one or more processors are configured to calculate a total risk score for the each network asset based on a risk weightage preassigned corresponding to each of the plurality of risk parameters and a summation of the risk score with respect to each of the plurality of risk parameters for the each network asset. Further, the one or more processors are configured to evaluate the risk associated with the each network asset based on the total risk score for the each network asset.

According to yet another embodiment, the present disclosure discloses a non-transitory computer-readable storage medium storing program instructions for evaluating risk associated with one or more network assets, the program instructions, when executed, perform the steps of receiving data associated with the one or more network assets. The data includes at least one of one or more risk identifiers for identifying a plurality of risk parameters associated with each network asset among the one or more network assets and one or more risk metrics associated with the one or more risk identifiers. Further, the one or more risk metrics indicate severity levels in the each network asset with respect to each of the plurality of risk parameters. The non-transitory computer-readable storage medium further performs the step of determining, corresponding to each of the severity levels in each of the plurality of risk parameters, a severity score for the each network asset based on the risk metric and a severity weightage preassigned corresponding to each of the severity levels. In an embodiment, the severity score is determined for each of the plurality of risk parameters for the one or more network assets. Further, the non-transitory computer-readable storage medium performs the step of calculating a risk score for the each network asset with respect to each of the plurality of risk parameters based on a summation of the severity score of each of the plurality of risk parameters. Further, the non-transitory computer-readable storage medium performs the step of calculating a total risk score for the each network asset based on a risk weightage preassigned corresponding to each of the plurality of risk parameters and a summation of the risk score with respect to each of the plurality of risk parameters for the each network asset. Further, the non-transitory computer-readable storage medium performs the step of evaluating the risk associated with the each network asset based on the total risk score for the each network asset.

The above summary is provided merely for the purpose of summarizing some exemplary embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

DESCRIPTION OF THE DRAWINGS

Figure 1:
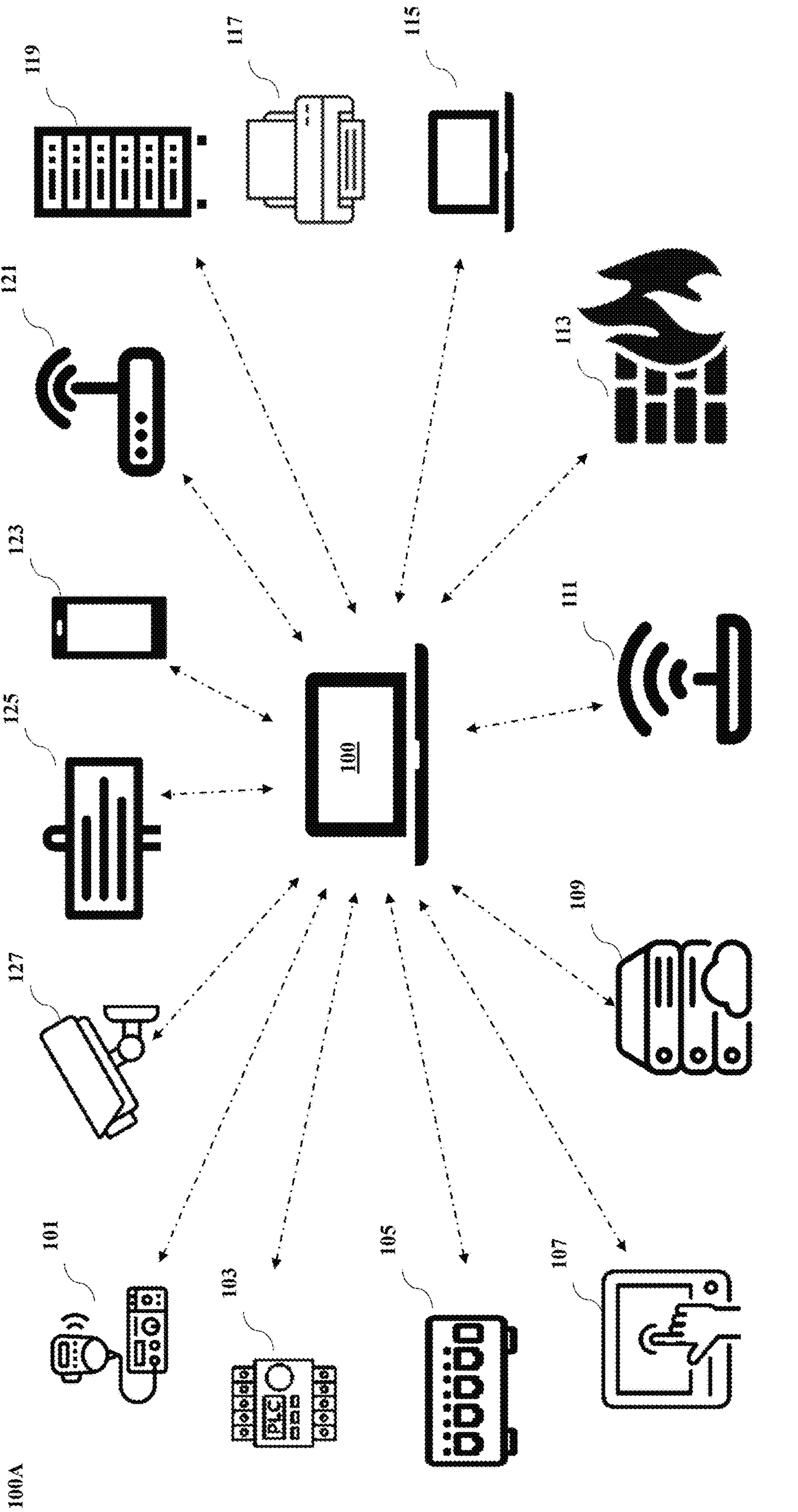
Figure 2:
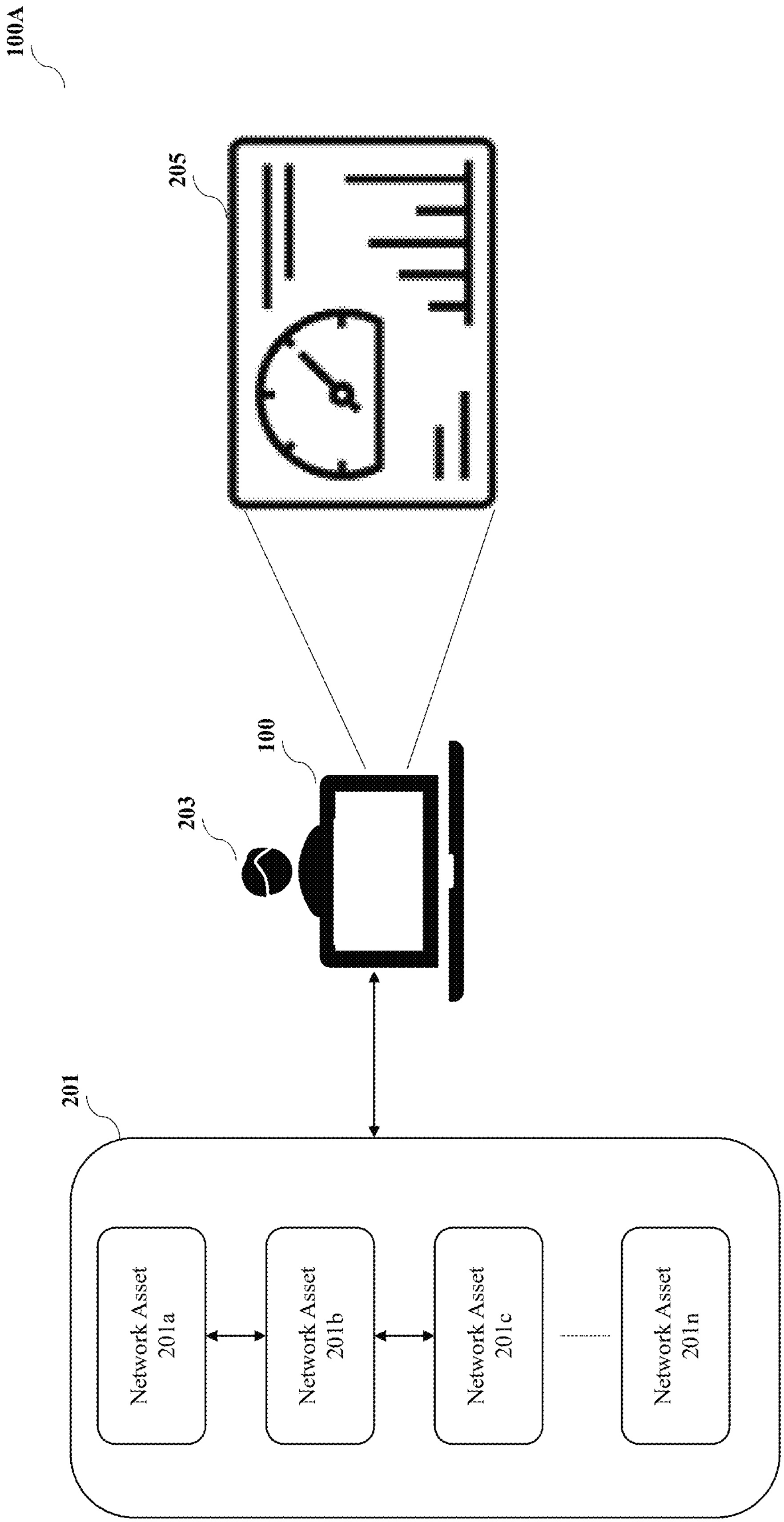
Figure 3:
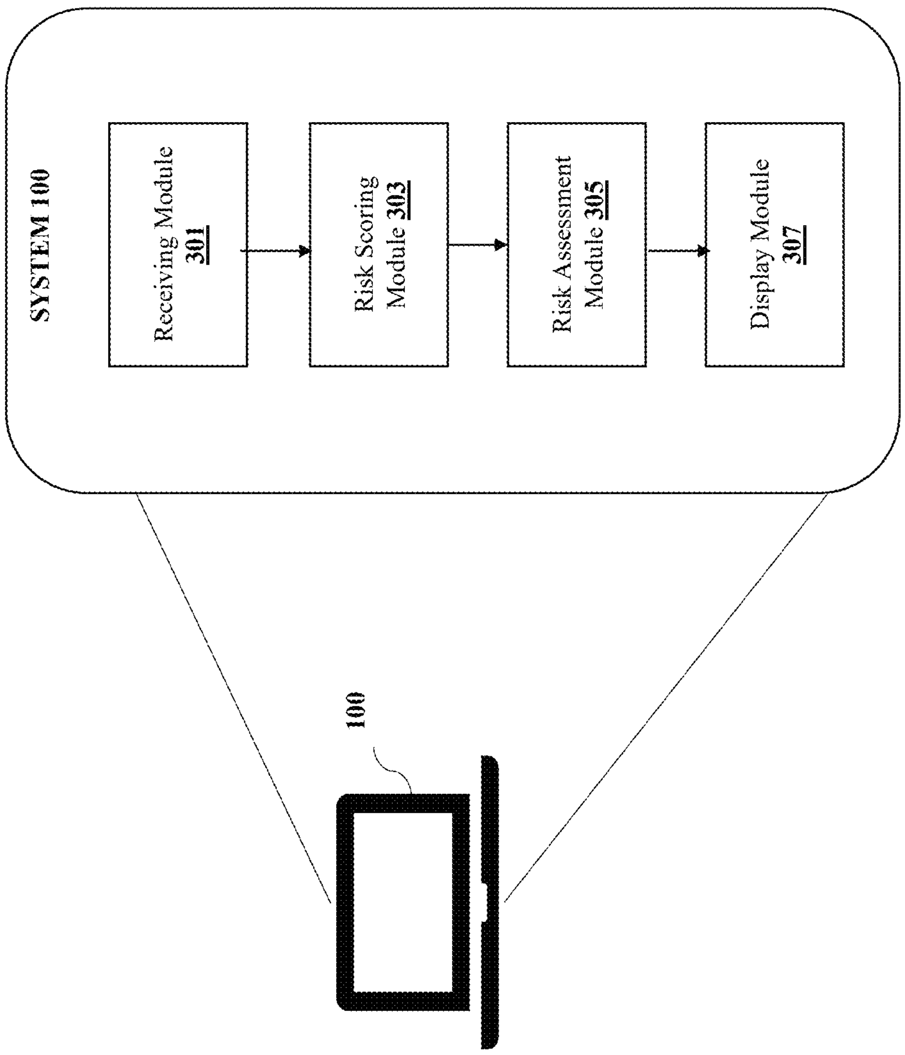
Figure 4:
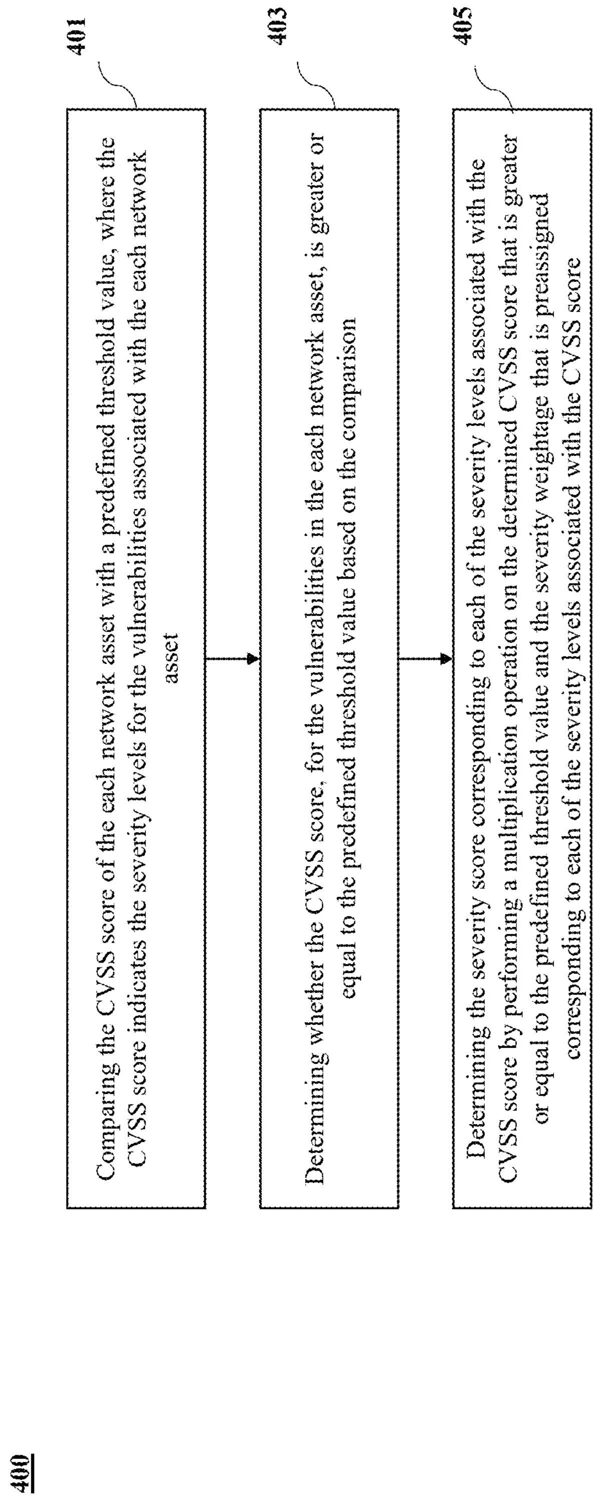
Figure 5:
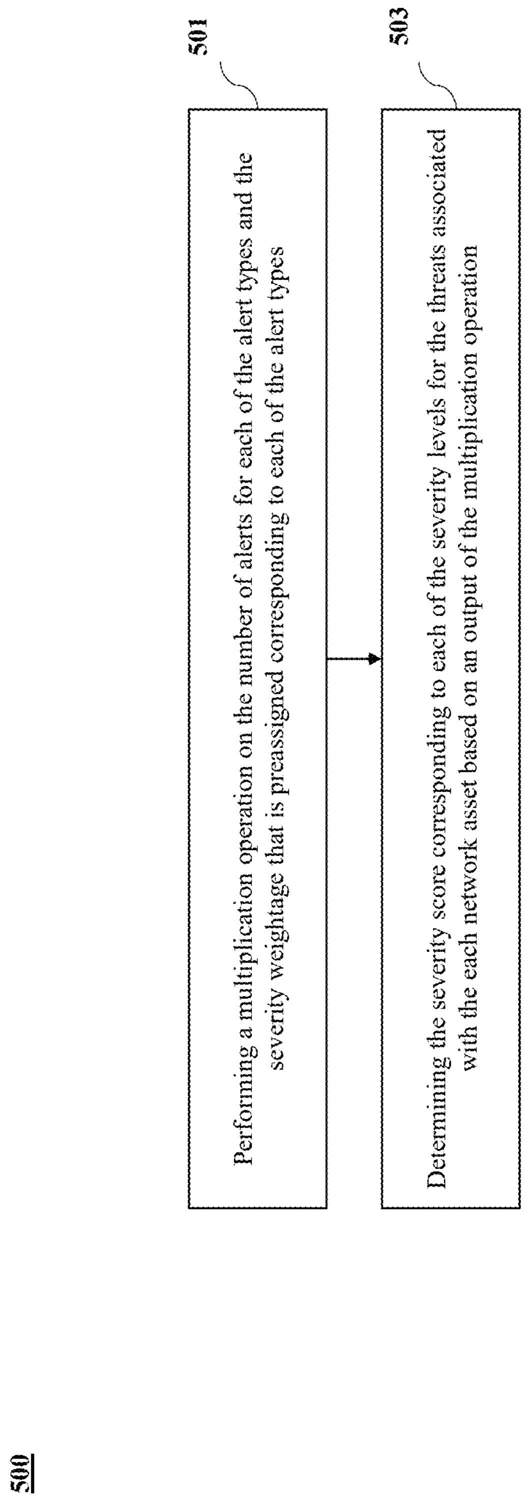
Figure 6:
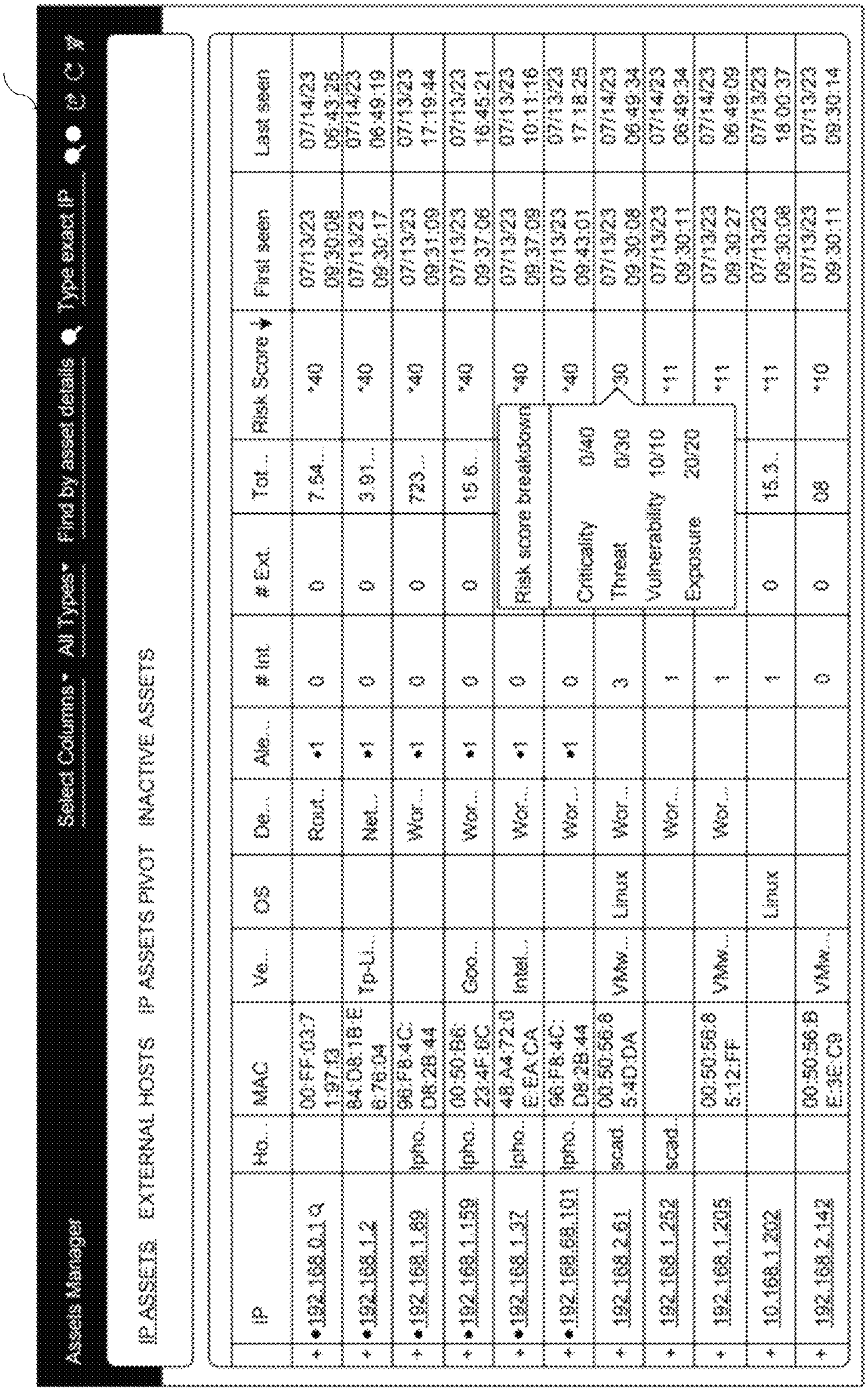
Figure 7:
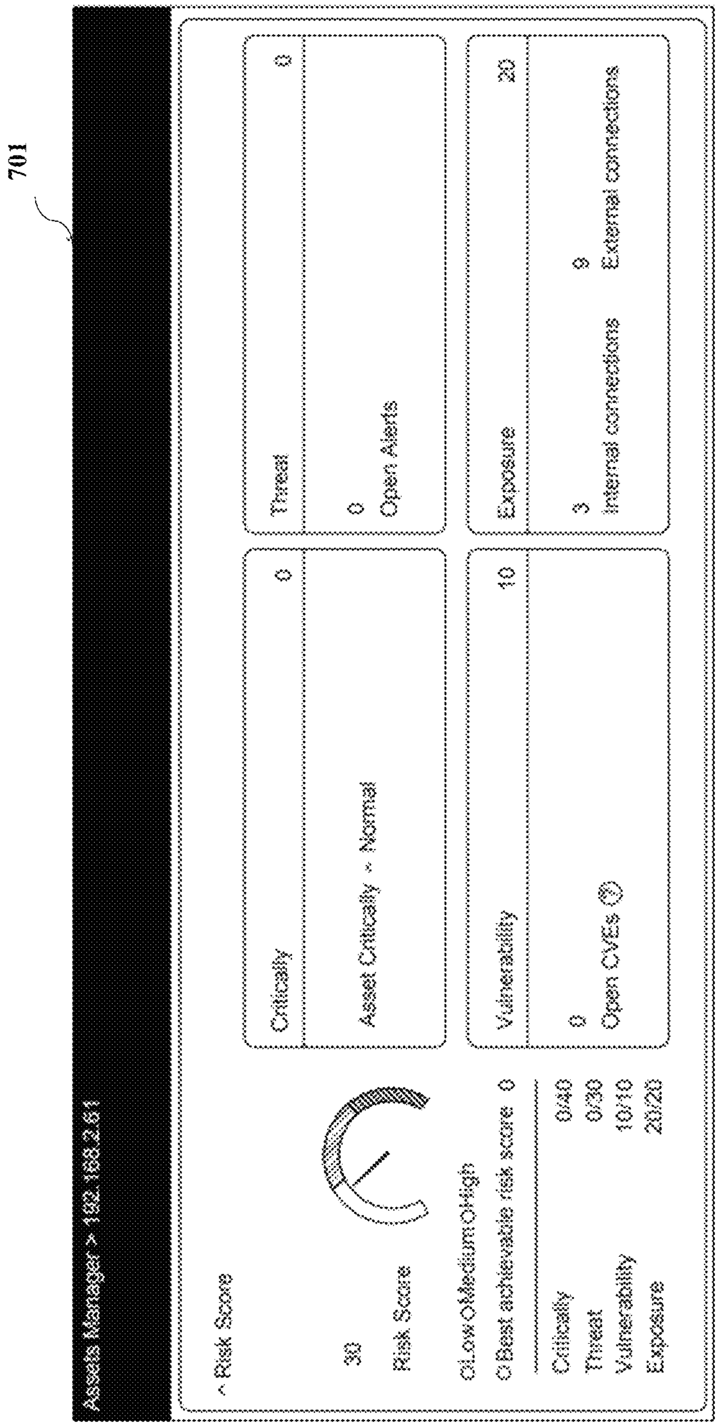
Figure 8:
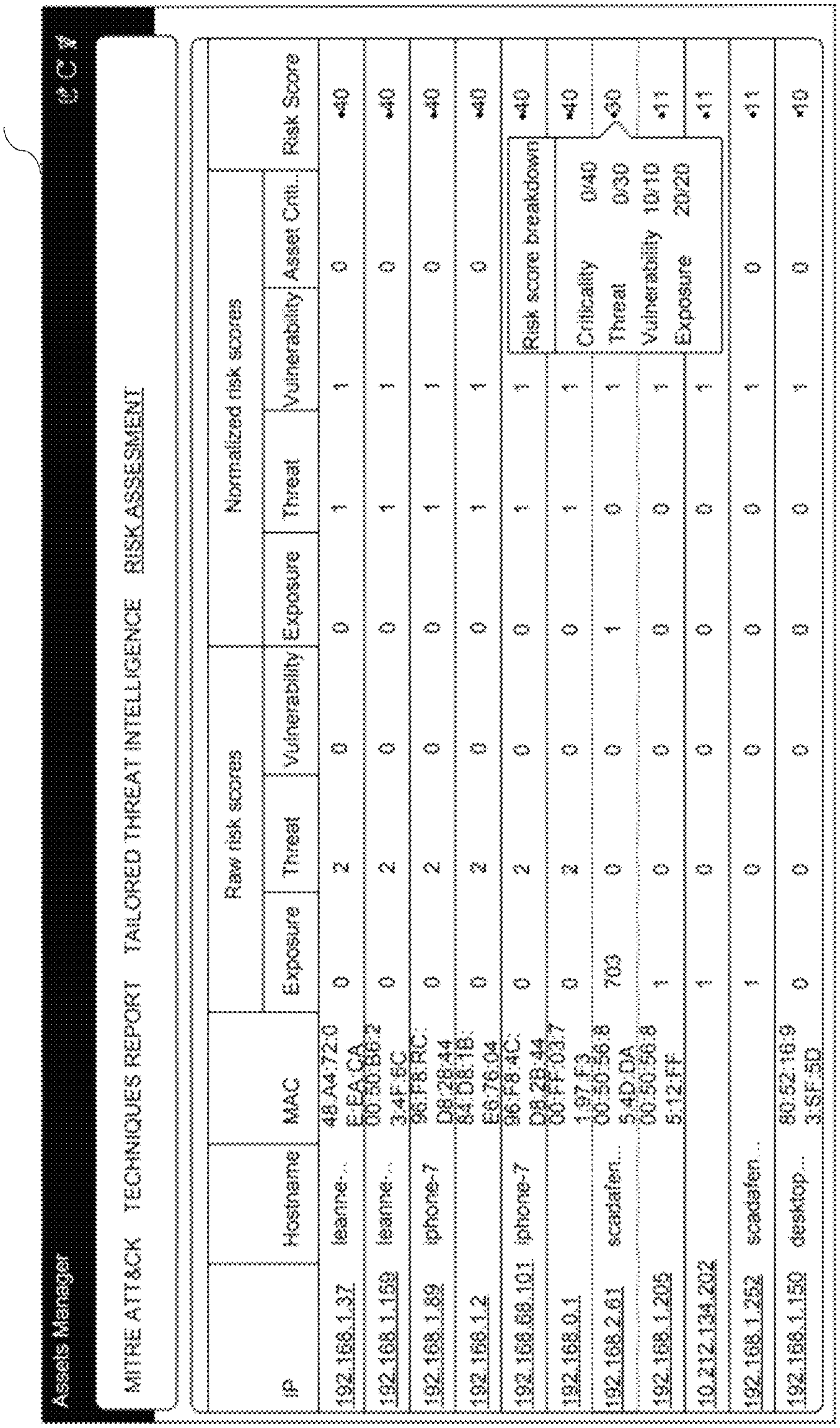
Figure 9:
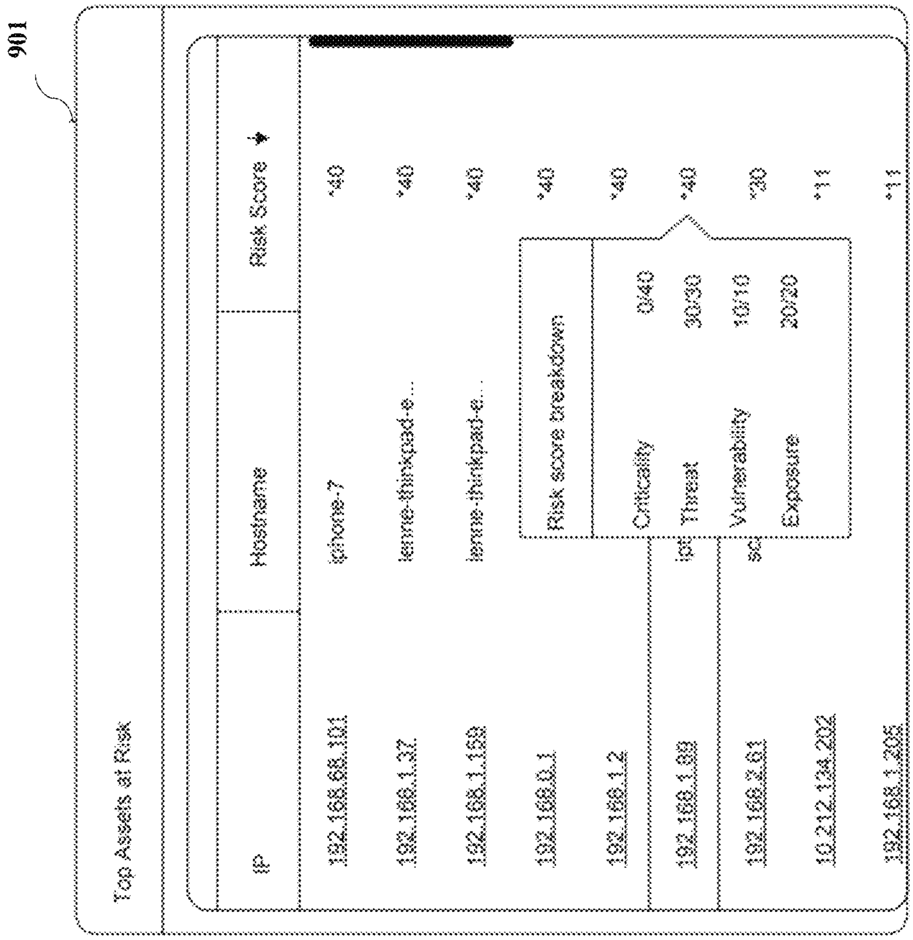
Figure 10:
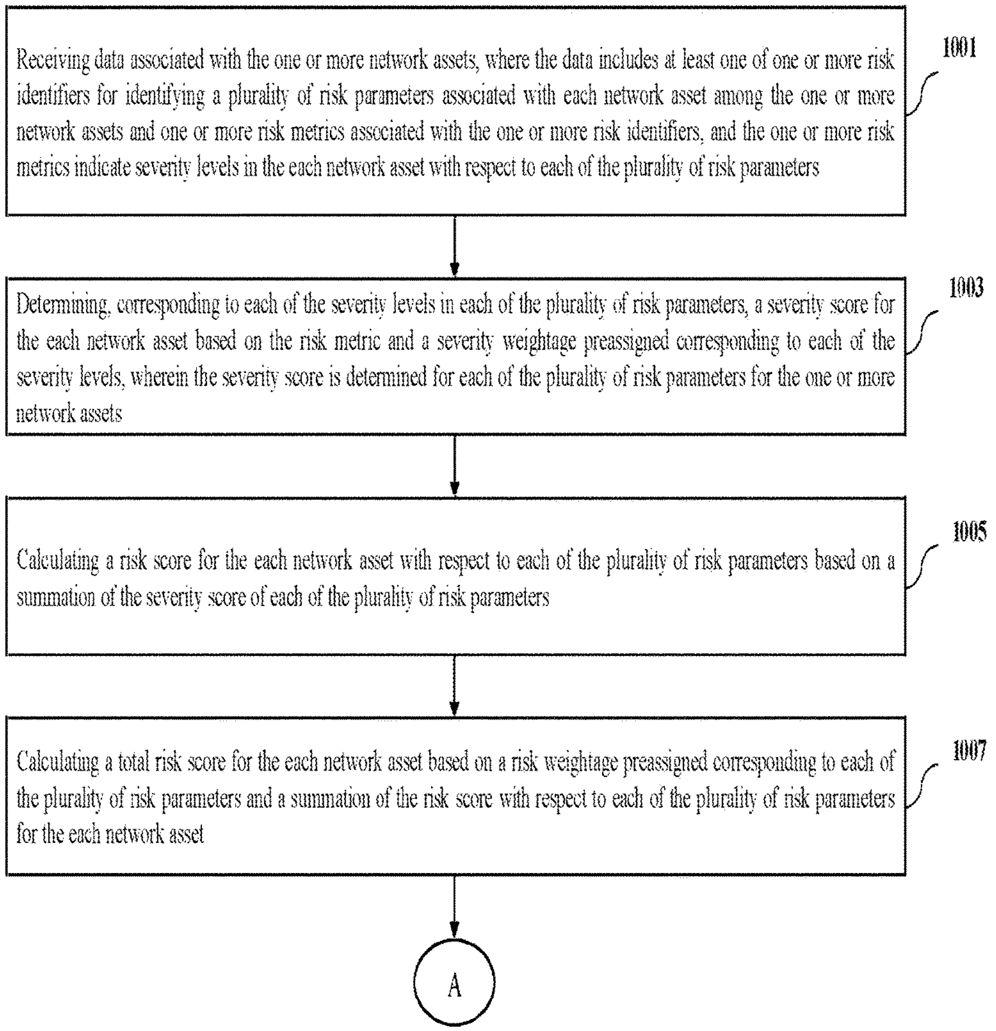
Figure 10:
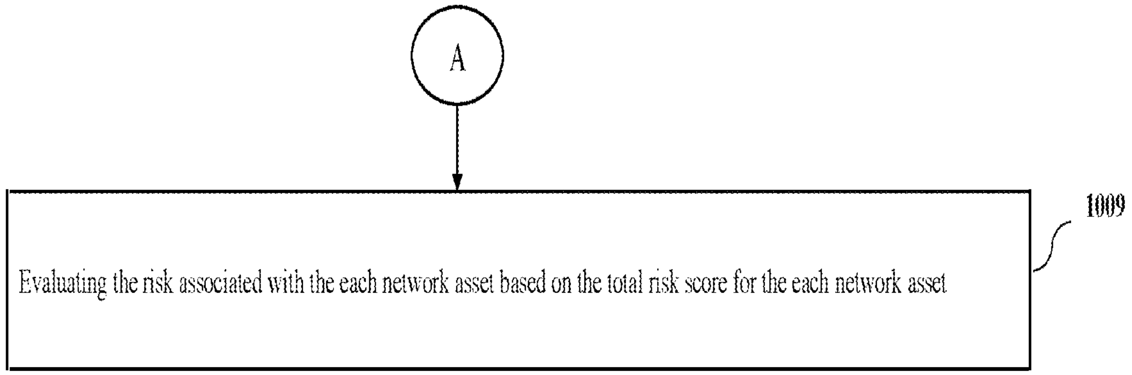
Figure 11:
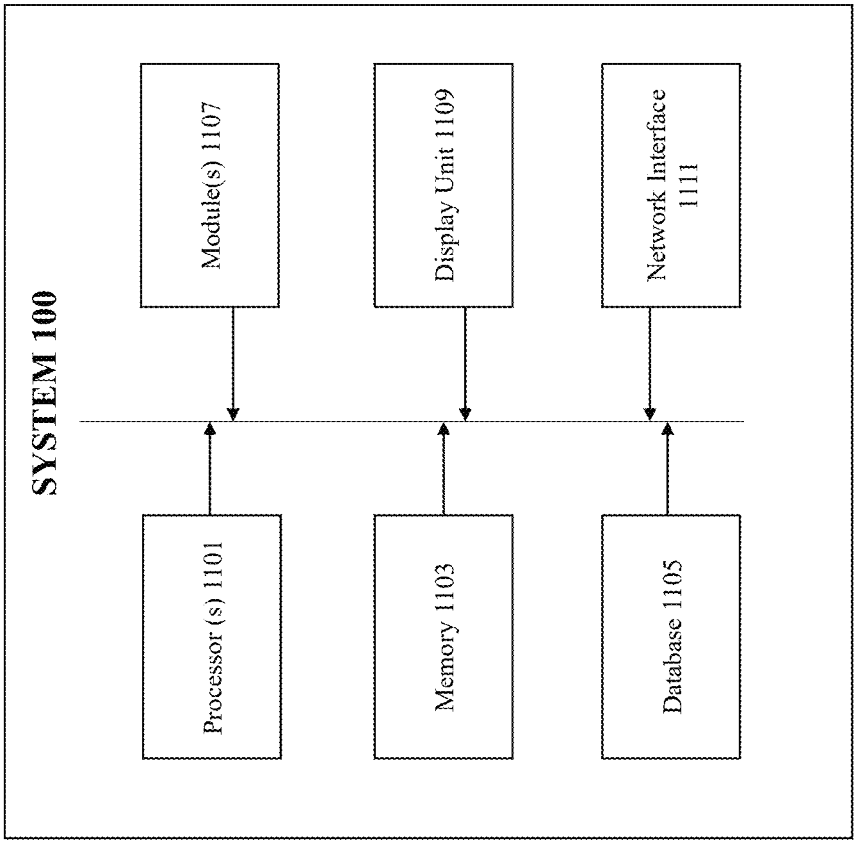

Having thus described the embodiments of the disclosure in general terms, reference now will be made to the accompanying drawings, which are not necessarily drawn to scale, and wherein:

FIG. 1 illustrates an example environment of a system connected with network assets in a network, according to an embodiment of the present disclosure;

FIG. 2 illustrates a simplified example environment as depicted in FIG. 1, according to an embodiment of the present disclosure;

FIG. 3 illustrates a detailed block diagram of the system depicted in FIG. 2, according to an embodiment of the present disclosure;

FIG. 4 illustrates a method for determining the severity score corresponding to each of the severity levels for the vulnerabilities associated with each network asset, according to an embodiment of the present disclosure;

FIG. 5 illustrates a method for determining the severity score corresponding to each of the severity levels for the threats associated with each network asset, according to an embodiment of the present disclosure;

FIG. 6 illustrates one example of the GUI, according to an embodiment of the present disclosure;

FIG. 7 illustrates yet another example of the GUI, according to an embodiment of the present disclosure;

FIG. 8 illustrates another example of the GUI, according to an embodiment of the present disclosure;

FIG. 9 illustrates yet another example of the GUI, according to an embodiment of the present disclosure;

FIG. 10 illustrates a method flow for evaluating risk associated with one or more network assets, according to an embodiment of the present disclosure; and FIG. 11 illustrates a general block diagram of the system, according to an embodiment of the present disclosure.

DESCRIPTION OF THE INVENTION

The description set forth below in connection with the appended drawings is intended as a description of various embodiments of the present invention and is not intended to represent the only embodiments in which the present invention may be practiced. Each embodiment described in this invention is provided merely as an example or illustration of the present invention, and should not necessarily be construed as preferred or advantageous over other embodiments. The description includes specific details for the purpose of providing a thorough understanding of the present invention. However, it will be apparent to those skilled in the art that the present invention may be practiced without these specific details.

Some embodiments of the present disclosure now will be described with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements.

An objective of the present disclosure is to address the demand for enhanced cybersecurity measures by providing users with a comprehensive risk assessment of their network assets. By employing a risk evaluation system, the present disclosure calculates a singular risk score for each network asset, taking into account various factors such as vulnerabilities, exposures, threats, and criticalities associated with the each network asset. Further, a total risk score is obtained by summing up all the risk scores with respect to each of the factors for every network asset in the network. The total risk score empowers users to quickly assess the security status of their network infrastructure, facilitating informed decision-making and proactive risk mitigation strategies.

By evaluating the security status of network components, organizations can proactively address weaknesses, prioritize resource allocation, and implement targeted security measures at a more granular level. The disclosed technique allows for the development of robust defense strategies to mitigate potential risks effectively.

In one embodiment, the present disclosure proposes a system and a method for evaluating the risk associated with network assets. More particularly, the present disclosure discloses the system and method for evaluating risk associated with network assets based on risk scoring. The present disclosure provides a risk evaluation system that calculates a singular risk score for each network asset. Further, the singular risk score for each network asset is displayed on a web user interface (UI) page to facilitate the user to quickly and efficiently monitor the security status of the network assets at a granular level. Further, the disclosed methodology precludes a need to provide extensive training to the user or a need for technical expertise.

FIG. 1 illustrates an example environment of a system 100 connected with network assets in a network, according to an embodiment of the present disclosure. According to an embodiment, FIG. 1 depicts an environment 100A that includes one or more network assets coupled with the system 100 in the network. As an example, the network assets may include transceivers 101, programmable logic controllers (PLCs) 103, ethernet switches 105, routers 121, human-machine interface (HMI) devices 107, servers 109, wireless access points 111, industrial firewall servers 113, personal computer (PC) 115, a printer 117, a mainframe 119, and the like. Other non-limiting examples of network assets may include a cell phone 121, display devices 125, a digital security camera 127, security systems (not shown), web-enabled appliances (not shown), and the like. The 'one or more network assets' may be collectively labeled as '101'. Further, the 'one or more network assets' may be alternately referred to as 'network assets' or 'network asset' or 'assets' or 'asset'.

According to an embodiment, each network asset forms a part of the network where each network asset may be wired or wirelessly connected with each other in the network. In a non-limiting example, the network may be a general network or a dedicated network segment or environment that has an infrastructure to monitor, analyze, and assess security events and incidents to identify potential risks in the network assets.

According to a further non-limiting example, each asset may be operatively coupled with the system 100. In a non-limiting example, the system 100 may be a computer, a laptop, a smartphone, remote servers, a Supervisory Control and Data Acquisition (SCADA) system, or any electronic machine. The system 100 may be alternately referred to as the risk evaluation system.

In an embodiment, the system 100 is configured to focus on the network assets within the environment 100A, organizations can enhance their ability to detect, investigate, and respond to security issues within an isolated network asset. The system 100 provides valuable insights into the security status of the network assets, generates alerts for suspicious activities, correlates security events, and facilitates risk assessment and mitigation efforts within the environment 100A.

FIG. 2 illustrates a simplified example environment 100A as depicted in FIG. 1, according to an embodiment of the present disclosure. In an embodiment, the environment 100A includes one or more network assets (e.g. network asset 201*a*, network asset 201*b*, network asset 201*c*, network asset 201*n*). The one or more network assets may be collectively labeled as 201. Further, similar components are labeled with the same reference numerals throughout the disclosure for ease of understanding.

According to an embodiment, the system 100 may be implemented with a risk-analyzing platform that periodically evaluates the risk associated with the network assets 201. According to a further embodiment, the system 100 may display a web page over a Graphical user interface (GUI) 205 to display the evaluation results for each network asset 201. In an embodiment, the GUI 205 depicts, for example, the IP address, MAC IDs, hostnames, risk scores in each category, total risk associated with each network asset, quantitative charts of the associated risk, and the like. The system 100 may be operated by operator 203 for evaluating the risk associated with each of the network assets 201 using the GUI 205. The GUI 205 is intuitive to provide an overall risk associated with each of the network assets 201 to the operator 203 having less expertise in technical analysis.

FIG. 3 illustrates a detailed block diagram of the system depicted in FIG. 2, according to an embodiment of the present disclosure. According to an embodiment, the system 100 includes a receiving module 301, a risk scoring module 303, a risk assessment module 305, and a display module 307 operatively coupled with each other. According to an embodiment, the receiving module 301, the receiving module 303, the risk scoring module 303, the risk assessment module 305, and the display module 307 are uniquely designed hardware modules or software modules.

According to some embodiments, functions of the receiving module 301, the risk scoring module 303, the risk assessment module 305, and the display module 307 can be performed by the processor(s). According to some embodiment, the receiving module 301, the risk scoring module 303, the risk assessment module 305, and the display module 307 are coupled with the risk analyzing platform to provide a detailed analysis of each of the network assets 201.

According to some embodiment, the risk analyzing platform can integrate with continuous integration (CI) products to develop application-specific solutions for evaluating risk for the network assets. Further, an explanation will be made by referring to modules depicted in FIG. 3. The labels depicted in the representative drawings are kept the same for similar components throughout the disclosure for ease of understanding. A detailed explanation of each module will be explained in the forthcoming paragraphs.

According to an embodiment, the receiving module 301 receives the data associated with the network assets 201. As an example, the data can be received from various platforms like one or more of an authorized risk-analyzing platform, a state-of-the-art risk-analyzing platform, a threat intelligence platform, a compliance management platform, a risk management platform, and the like. The aforesaid platforms can be installed locally in the system 100 or outside the system 100. According to some embodiment, the data can be received from a specifically developed platform installed locally within the system 100.

As an example, the data includes risk identifiers for identifying risk parameters associated with each network asset 201 and risk metrics associated with the risk identifiers. The risk metrics indicate severity levels in the each network asset 201 with respect to each of the risk parameters. In a non-limiting example, the risk parameters include at least one of vulnerabilities, exposures, threats, and criticalities associated with each network asset 201. The risk parameters are important for effective risk management and security planning for all the network assets in the network. Organizations use this understanding to assess, prioritize, and address security risks to protect their network assets and data from threats. Following are the general definitions of the various risk parameters that are considered for evaluating risk in the disclosure.

- Vulnerabilities: Vulnerabilities are weaknesses or flaws in a system's design, implementation, or operation that could be exploited to compromise the security of the system. Vulnerabilities can exist in software, hardware, networks, and even human processes. They are often inadvertently introduced during the development or deployment of technology and require mitigation to reduce the risk of exploitation.
- Exposures: An exposure refers to a particular instance where a vulnerability may be at risk of being exploited. When a vulnerability is exposed, it means that the conditions exist for a potential attacker to take advantage of the weakness.

Threats: Threats are potential dangers or malicious activities that can exploit vulnerabilities or exposures to cause harm to an organization's assets, data, or operations. Threats can include various forms of cyberattacks, such as malware infections, phishing scams, data breaches, ransomware attacks, insider threats, and the like.

Criticalities: Criticality term refers to the severity level assigned to a particular vulnerability, exposure, threat, or security incident based on its potential impact on an organization's assets, operations, reputation, or compliance requirements. Criticality assessments help prioritize risk mitigation efforts and allocate resources effectively to address the most significant risks first.

In a further non-limiting example, the risk metrics includes a list of Common Vulnerabilities and Exposures (CVE), Common Vulnerability Scoring System (CVSS) score, alert types, a number of alerts for each alert types, exposure types, criticality types, a number of criticalities for each of the criticality types for the each network asset 201. In an embodiment, the risk metrics indicate severity levels in each network asset 201 with respect to each of the plurality of risk parameters.

For example, organizations often subscribe to an authorized vulnerability databases or proprietary vulnerability information sources. These databases provide information about CVEs, CVSS scores, and related alerts for known vulnerabilities. For instance, the list of CVEs includes a list of CVE identifiers that are assigned for each vulnerability entry. The CVE identifier can be used to identify specific threats and assess the criticality of vulnerabilities in network assets 201. The CVE identifiers provide a standardized way to reference and identify known vulnerabilities, making it easier for organizations to track and manage security issues across their systems and assets. Further, each vulnerability is assigned with a CVSS score respective to each CVE identifier. For example, the score ranges from 0.0 to 10.0, with 10.0 representing the highest severity. Table 1 shows an example of risk metrics for vulnerabilities depicting various severity levels in the CVSS scoring system.

TABLE 1

| CVSS score | Severity level |
|---|---|
| 0.0 to 3.9 | Low severity |
| 4.0 to 6.9 | Medium severity |
| 7.0 to 10.0 | High severity |

According to some embodiment, the CVE can be used to identify other risk parameters like exposures, threats, and criticalities associated with the each network asset 201 as aforesaid risk parameters are often linked with vulnerabilities. According to some embodiments, there are certain state-of-the-art frameworks that are specifically designed to address exposure, threats, and criticalities.

In an embodiment, the risk metric further provides detailed information about the alert types like whether the alert is a critical alert, a high alert, a medium alert, a low alert, or a notification alert. Similarly, the risk metric further provides detailed information about the exposure types like whether the exposure is a direct exposure, an indirect exposure, or a small exposure. The risk metric further provides detailed information about the criticality types like whether the criticality is highly critical, a medium critical, or a normal critical.

According to an embodiment, the risk scoring module 303 calculates the risk by considering the risk parameters as discussed in the above paragraphs. In particular, the risk scoring module 303 identifies the risk associated with each network asset 201 by using the received data. For example, the risk scoring module 303 identifies that the network asset 201 might be at the risk of being vulnerable based on the risk identifier, might be exposed to direct connection, and getting a high number of critical alerts based on the received data. Likewise, the risk scoring module 303 identifies the risk associated with every network asset 201 in the network.

In an embodiment, the risk scoring module 303 determines, corresponding to each of the severity levels in each of the plurality of risk parameters, a severity score for the each network asset based on the risk metric and a severity weightage that was preassigned corresponding to each of the severity levels. In particular, the risk scoring module 303 determines the risk score for each severity level in the vulnerabilities, exposures, threats, and criticalities for every network asset 201. The forthcoming paragraphs will describe the determination of the severity level in detail along with examples.

FIG. 4 illustrates a method 400 for determining the severity score corresponding to each of the severity levels for the vulnerabilities associated with each network asset, according to an embodiment of the present disclosure. According to an embodiment, the method 400 is implemented in the risk scoring module 303.

In an embodiment, for determining the severity score corresponding to each of the severity levels for the vulnerabilities associated with the each network asset 201, the risk scoring module 303, at step 401, compares the CVSS score of the each network asset 201 with a predefined threshold value. As explained in the above paragraphs the CVSS score indicates the severity levels of the vulnerabilities associated with the each network 201. Further, the risk scoring module 303, at step 403, determines whether the CVSS score, for the vulnerabilities in the each network asset, is greater or equal to the predefined threshold value based on the comparison. Further, the risk scoring module 303, at step 405, determines the severity score corresponding to each of the severity levels associated with the CVSS score by performing a multiplication operation on the determined CVSS score that is greater or equal to the predefined threshold value and the severity weightage that is preassigned corresponding to each of the severity levels associated with the CVSS score.

Table 2 depicts an example of calculating the severity score with respect to vulnerabilities corresponding to each severity level and a singular vulnerability score (i.e. a risk score) for each of the network assets 201.

TABLE 2

| |
|---|
| vs_1 = 20 × (# of Full-Match CVEs with CVSS >= 9.0) |
| vs_2 = 10 × (# of Full-Match CVEs with 9.0 > CVSS >= 7.0) |
| vs_3 = 5 × (# of Full-Match CVEs with 7.0 > CVSS >= 4.0) |
| vs_4 = 2 × (# of Full-Match CVEs with CVSS < 4.0) |
| vs_5 = 2 × (# of Partial-Match CVEs with CVSS >= 9.0) |
| vs_6 = 1 × (# of Partial-Match CVEs with 9.0 > CVSS >= 7.0) |
| vs_7 = 0.5 × (# of Partial-Match CVEs with 7.0 > CVSS >= 4.0) |
| vs_8 = 0.1 × (# of Partial-Match CVEs with CVSS < 4.0) |
| vulnerability_score = vs_1 + vs_2 + vs_3 + vs_4 + vs_5 + vs_6 + vs_7 + vs_8 |

Consider an example scenario for network asset **201*a*, for calculating the risk score for the network asset 201*a*. According to an example embodiment, shown in Table 2, the risk scoring module 303, at first, compares a CVSS score greater or equal to 9 (i.e. predefined threshold value). If the CVSS score is determined to be greater or equal to 9, then, the risk scoring module 303 assigns the score vs_1 to the network asset 201***a* by performing a multiplication of the CVSS score and the severity weightage (in this case it is 20) that is preassigned to this severity levels associated with the CVSS score.

Similarly, the risk scoring module 303 assigns the risk score vs_2 to the asset network asset 201*a* based on the CVSS score greater than 8, and multiplying it by the severity weightage (in this case it is 10) that is preassigned to this severity level associated with the CVSS score and so on. Accordingly, the risk scoring module 303 assigns the risk scores (vs_1, vs_2, vs_3, vs_4, and so on) corresponding to each severity level of the network asset 201*a* as shown in Table 2. Likewise, the risk scoring module 303 determines the risk score for vulnerabilities for every network asset 201 in the network. Further, the risk scoring module 303 calculates a single vulnerability score (i.e. vulnerability_score) for network asset 201*a* by taking a summation of all the assigned vulnerability scores. Likewise, the risk scoring module 303 determines the single vulnerability score (i.e. vulnerability_score) for every network asset 201 in the network. The assigned risk scores (for example vs_1, vs_2 . . . and so on) may be alternatively referred to as severity score and the singular vulnerability score may be alternatively referred to as a risk score.

FIG. 5 illustrates a method 500 for determining the severity score corresponding to each of the severity levels for the threats associated with each network asset, according to an embodiment of the present disclosure. According to an embodiment, the method 500 is implemented in the risk scoring module 303.

According to an embodiment, the risk scoring module 303 calculates a threat score (i.e. threat_score) for each of the network assets 201*a* in the network. In an embodiment, the risk scoring module 303 based on the received data that includes information about the number of alerts and correlated severities and the severity weightage that is preassigned corresponding to each of the alert types determines the threat score corresponding to each of the severity levels for the threats associated with the each network asset 201. In an embodiment, the correlated severities may indicate whether the alert is critical, high, medium, low, or a notification.

Accordingly, the risk scoring module 303, at step 501, performs a multiplication operation on the number of alerts for each of the alert types and the severity weightage that is preassigned corresponding to each of the alert types. Further, at step 503, the risk scoring module 303 determines the severity score corresponding to each of the severity levels for the threats associated with the each network asset based on an output of the multiplication operation.

Table 3 depicts an example of calculating the severity score with respect to threat corresponding to each severity level and a singular threat score (i.e. a risk score) for each of the network assets 201.

TABLE 3

| |
|---|
| ts_1 = 10 × (# of Critical alerts) |
| ts_2 = 5 × (# of High alerts) |
| ts_3 = 1 × (# of Medium alerts) |
| ts_4 = 0.1 × (# of Low alerts) |
| ts_5 = 0 × (# of Notification alerts) |
| threat_score = ts_1 + ts_2 + ts_3 + ts_4 + ts_5 |

Consider an example scenario for network asset 201*a*, for calculating the threat score for the network asset 201*a*. According to an example embodiment, the risk scoring module 303, obtains a number of critical alters, a number of medium alerts, a number of low alerts, or a number of notification alerts based on the received data. According to an example embodiment, shown in Table 3, for calculating the threat score ts_1, the risk scoring module 303, at first, performs the multiplication of the number of critical alerts and the severity weightage (in this case it is 10) that is preassigned to this severity levels associated with critical alerts type. Based on the multiplication operation the threat score ts_1 is obtained. Likewise, the threat score ts_2 is obtained based on the multiplication of a number of high alerts and the severity weightage (in this case it is 5) that is preassigned to this severity level associated with high alerts type.

Accordingly, the risk scoring module 303 assigns the risk scores (ts_1, ts_2, ts_3, ts_4, and so on) corresponding to each severity level of the network asset 201*a* as shown in Table 3. Likewise, the risk scoring module 303 determines the risk score for severities for every network asset 201 in the network. Further, the risk scoring module 303 calculates a single threat score (i.e. threat_score) for network asset 201*a* by taking a summation of all the determined threat scores. Likewise, the risk scoring module 303 calculates the singular threat score (i.e. threat_score) for each of the network assets 201 in the network. The risk scores (for example ts_1, ts_2, ts_3, ts_4) may be alternatively referred to as the severity score and the singular threat score may be alternatively referred to as the risk score for threats.

According to an embodiment, for calculating the exposure risk score for each of the network assets 201 corresponding to each of the severity levels for the exposures associated with each network asset, the risk scoring module 303 considers the number of direct exposures, the number of indirect exposures, and the number of small exposures in the each of the network assets 201.

Accordingly, the risk scoring module 303, determines the severity score corresponding to each of the severity levels for the exposures associated with the each network asset 201 based on a predefined exposure risk factor, the severity weightage that is preassigned corresponding to each of the exposure types, an average amount of traffic in the each network asset. Table 4 depicts an example of calculating the exposure score of each network asset 201 corresponding to each of the severity levels and a singular exposure score for each of the network assets 201.

TABLE 4

| |
|---|
| exposure_score = exposure_risk_factor * exposure_asset_factor * (1.5 – ½^n) --- (1) |
| exposure_risk_factor = 20 (default) --- (2) |
| exposure_asset_factor = 1/0.5/0.1 (direcy/indirect/small) --- (3) |
| n = 1 + log (x)//log base 10 --- (4) |
| x = asset_total_traffic_in_mb/asset_total_connections (int + ext) --- (5) |
| edge cases: |
| If asset_total_connection == 0 ---> exposure_score = 0 --- (6) |
| If asset_total_traffic_in_mb == 0 ---> exposure_score = 0 --- (7) |
| If x < 0.1 ---> n = 1 (8) --- (8) |

In general, the exposure of the assets to the external connections and the internal connections was considered. However, merely considering the external connections and the internal connections fails to provide appropriate data related to the exposures of the assets in the network. Therefore, in an embodiment, direct exposure, indirect exposure, and small exposure having the predefined exposure asset factor as 1, 0.5. and 0.1 respectively as shown in equation 3 are considered. In an embodiment, the predefined exposure asset factor may be considered as the severity levels that can face the network asset 201. Further, the exposure risk factor is predefined as 20 as shown in equation 2. According to an embodiment, equation 5 determines the average amount of traffic in the each network asset 201. Further, a logarithmic value of the average amount of traffic in the each network asset 201 is used for utilizing it in equation 1. Accordingly, by using equation 1, an exposure score (i.e. exposure severity score or severity score) is determined for every network asset. According to some embodiment, for the network assets that are at the edges, if the asset total connections are determined to be zero or if the asset total traffic is measured as zero then the exposure score is taken as zero. Further, if the average amount of traffic in the each network asset 201 is found to be greater than 0.1 then n is determined as 1 as shown in equation 8. The exposure risk score for each severity level may be alternatively referred to as the severity score for exposure. Further, each severity score is summed to obtain a singular exposure risk score for all network assets 201. The singular exposure risk score may alternatively referred to as the risk score for exposure.

For example, based on the equations shown in Table 4 a severity score corresponding to each severity level for the network asset 201*a* is determined. Further, the summation of each of the severity scores is performed to obtain a singular exposure risk score for network asset 201*a*. Likewise, a similar operation is performed for all the network assets 201.

According to a further embodiment, the risk scoring module 303 determines the severity score corresponding to each of the severity levels for the criticalities associated with each network asset based on a predefined criticality factor, the severity weightage that is preassigned corresponding to each of the criticality types, and the number of criticalities for each of the criticality types associated with the each network asset. The equation for determining the severity score corresponding to each of the severity levels for the criticalities is given in the equations below.

Overall_criticality_factors = {'High' : 1, 'Medium' : 0.5, 'Normal' : 0} (9)

Risk score_criticality = overall_criticality_factors [asset_criticality] (10)

In an embodiment, the overall_criticality_factor corresponds to the predefined criticality factor. Further, the asset_criticality includes the severity weightage that is preassigned corresponding to each of the criticality types, and the number of criticalities for each of the criticality types associated with the each network asset. According to an example embodiment, the risk scoring module 303 calculates the risk score_criticality for each of the network asset 201 for every severity level i.e. high, medium, and normal for network asset 201*a*. The risk score_criticality thus obtained is then summed up to obtain a singular risk score_criticality score for network assets 201*a*. In an embodiment, the risk score module 303 obtains the risk score_criticality for every severity level for all the network assets. Likewise, the risk score module 303 determines the singular risk score_criticality score for all the network assets 201 in the network. The risk score_criticality that is determined for every severity level may be alternately referred to as severity score for criticality and the singular risk score_criticality score may be alternatively referred to as risk score for criticality.

The risk scoring module 303 calculates a singular risk score for each network asset 201 with respect to each of the plurality of risk parameters based on a summation of the severity score of each of the plurality of risk parameters. In particular, the risk scoring module 303 calculates a singular risk score respective to each of the risk parameters i.e. vulnerabilities, exposures, threats, and criticalities associated with the each network asset 201. This provides detailed information about the specific risk associated with each network asset 201.

In an embodiment, the risk scoring module 303 further calculates a normalized risk score for each of the factors calculated above i.e. normalized vulnerability score, normalized threat score, and a normalized exposure score, for computing a total risk score for each of the network assets 201. Table 5 depicts an example of calculating the normalized risk score.

TABLE 5

```
normalize_value(value, factor):
  divisor = value/factor
  normalized_factor = 2 − (1/(2 ** (divisor − 1)))
  normalized_value = factor * normalized_factor
```

In an embodiment, the singular risk score is defined as the value as shown in the Table 5. For example, consider the value of the vulnerability score=70 and factor=20. Accordingly, the divisor becomes 3. Further, the normalized factor and the normalized value are given by the below equations.

$$\text{normalized factor} = 2 - 1/4 = 1.75 \quad (11)$$

$$\text{normalized value} = 20 * 1.75 = 3 \quad (12)$$

After normalizing the values, the risk scoring module 303 calculates a total risk score for each network asset 201 based on a risk weightage preassigned corresponding to each of the plurality of risk parameters and a summation of the risk score (i.e. the singular risk score) with respect to each of the plurality of risk parameters for the each network asset. The equation for calculating the total risk score is given in Table 6.

TABLE 6

```
rs_1 = 20 × normalized_vulnerability_score
rs_2 = 30 × normalized_threat_score
rs_3 = 20 × normalized_exposure_score
rs_4 = 30 × overall_criticality_factors[asset_criticality
total_score = rs_1 + rs_2 + rs_3 + rs_4
```

As can be seen, at first, the risk scoring module 303 multiplies the normalized vulnerability score (i.e. normalized_vulnerability_score) by the risk weightage (i.e. 20) preassigned corresponding to the vulnerability. A similar operation is performed with the risk scores of other risk parameters with their corresponding preassigned risk weightage (i.e. 20). In an embodiment, the risk scoring module 303 obtains the risk score (for example, rs_1, rs_2, rs_3, rs_4, and the like) for each network asset 201. According to an embodiment, the risk scoring module 303 further calculates the total risk score (i.e. the total_score) by summing up the risk scores determined for all the risk parameters for every network asset 201. For example, the total risk score is determined for the network asset 201*a*, the network asset 201*b*, the network asset 201*c*, and the network asset 201*n*.

In an embodiment, the total risk score of all the network assets 201 is evaluated by the risk assessment module 305. In particular, the risk assessment module 305 evaluates the total risk score of all the network assets 201 by comparing it with the predefined threshold value to determine high-risk network assets among all the network assets 201. For example, the network assets 201*a*, the network assets 201*c*, and the network assets 201*n* are the assets that are at high risk. Based on the determination of all the high-risk network assets, the display module 307 displays on the graphical user interface (GUI), the determined high-risk network assets. According to an embodiment, the GUI displays the high-risk network assets along with the total risk score and the risk score respective of each of the risk parameters.

FIGS. 6-9 illustrate various examples of the GUI, according to an embodiment of the present disclosure. In an example embodiment, an application can be deployed in the system 100 for evaluating the risk associated with each network asset 201. In an embodiment, the web page can be opened upon operating the application. As shown in FIG. 6, the GUI 601 provides various functionalities for evaluating the risk associated with the network assets 201. For example, under the IP Assets tab of the GUI 601, the system 100 provides various information about the network assets 201 such as the IP address, MAC IDs, hostnames, risk scores in each category, total risk associated with each asset, operating system name, vendor name, network assets status, timestamp of network assets, timestamp of detected activity of the network assets, and the like.

Further, as shown in FIG. 7, the GUI 701 provides an example of a graphical representation of the risk score for a single asset. In an embodiment, the GUI 701 graphically represents the risk score in three categories i.e. low, medium, and high. Further, the GUI 701 provides information about calculated scores under various categories such as criticality, threat, vulnerabilities, exposure, and the like. According to some embodiment, the GUI 701 provides information about the status of criticality (e.g. Normal), number of open common vulnerabilities and exposure (CVEs), number of threats, number of exposures of the network assets to external and internal connections, and the like. In an embodiment, the risk score for all the network assets can be analyzed in a detailed manner via the GUI 701.

FIG. 8 shows the GUI 801 which provides an analysis of the security of each of the network assets 201. In an example embodiment, the GUI 801 provides information such as the IP address, MAC IDs, hostnames, risk scores in each category, total risk associated with each asset, and the like. For example, the GUI 801 provides the risk score in categories like exposure, threat, and vulnerabilities. The GUI 801 further provides a total risk score and a breakdown of the total risk score calculated for each network asset 201. FIG. 9 shows a GUI 901 that provides information about the top high-risk assets that are at high risk. For example, the GUI 901 provides details of IP address, hostnames, and risk scores. Accordingly, the operator 203 monitoring the network assets can quickly and efficiently monitor the status of the network assets 201 and proactively mitigate potential risks.

According to an embodiment, the risk scoring module 303 defines configurations of the predefined weights for each risk parameter in a specific data format, such as JSON and TOML. Table 7 depicts the example of the defined configurations.

TABLE 7

```
Json ('riskModelConfig.json')
  Threat weights = [10, 5, 1, 0.1, 0] = [Critical, High, Medium,
  Low, Notification]
  Vulnerability weights = [20, 10, 5, 2, 2, 1, 0.5, 0.1] = [Critical-
  Full, High-Full, Medium-Full, Low-Full
  Critical-Partial, High-Partial, Medium-Partial, Low-Partial]
  Exposure weights = [1, 0.1] = [External, Internal]
  Criticality weights = [1, 0.5, 0] = [High, Medium, Normal]
  Total weights = [20, 30, 20, 30] = [Vulnerability, Threat,
  Exposure, Criticality]
Toml
  Feature flag [true]
  Calculation period = [30]
```

Table 8 depicts an example of the database schema for the calculated risk score and the calculated normalized score.

TABLE 8

```
'risk_score': {
  'raw': {
    'exposure': 500,
    'threat': 40,
    'vulnerability': 3,
    'criticality': 0.5
  },
  'normalized': {
    'exposure': 20,
    'threat': 30,
    'vulnerability': 3,
    'criticality': 15
  },
  'total': 68,
  'timestamp': <ISODate object>
}
```

According to a further embodiment, the risk assessment module 305 evaluates the total risk score and accordingly, the information about the risk of each of the network assets is displayed on the web page or GUI as depicted in FIGS. 6-9.

According to a further embodiment, the risk scoring module 303 periodically calculates the risk score. Accordingly, the risk assessment module 305 periodically evaluates the risk score and provides the updated information to display on the GUI. Thus, the GUI periodically displays the top high-risk IPs of the network assets at risk, so the operator can view the network assets' total score and score breakdown.

Tables 9 and 10 show an example of the performances of the system 100 based on the risk scores.

TABLE 9

```
DB Novelis - mongodump-SFP-7.2.1.155-16_05_2023.tar.gz
Local hosts:
  Total: 1876
  /w CVEs: 226
  /w alerts: 1599
  /w internal connections: 1745
  /w external connections: 655
Run time: ~2.5 sec
```

TABLE 10

| |
|---|
| DB Murata (IMC) - imc_platform_mongodump_CNM_24_02_2023.tar.gz |
| Local hosts: |
| Total: 35859 |
| /w CVEs: 480 |
| /w alerts: 15954 |
| /w internal connections: 27660 |
| /w external connections: 28555 |
| Run time: ~20 sec |

FIG. 10 illustrates a method flow for evaluating risk associated with one or more network assets, according to an embodiment of the present disclosure. In an embodiment, the method 1000 is implemented in the system 100. Further, the steps comprised in the method 1000 have been explained in detail through FIGS. 1-9 and from Tables 1 to 10.

In an embodiment, the method 1000, at step 1001 include receiving data associated with the one or more network assets. The data includes at least one of one or more risk identifiers for identifying a plurality of risk parameters associated with each network asset among the one or more network assets and one or more risk metrics associated with the one or more risk identifiers. Further, the one or more risk metrics indicate severity levels in the each network asset with respect to each of the plurality of risk parameters. In an embodiment, the plurality of risk parameters comprising at least one of vulnerabilities, exposures, threats, and criticalities associated with the each network asset. Further, the one or more risk metrics comprises the list of Common Vulnerabilities and Exposures (CVEs), the Common Vulnerability Scoring System (CVSS) score, alert types, the number of alerts for each of the alert types, exposure types, criticality types, the number of criticalities for each of the criticality types for the each network asset. In an embodiment, the number of alerts includes at least one of the number of critical alerts, the number of high alerts, the number of medium alerts, the number of low alerts, and the number of notification alerts for each of the alert types. Further, the alert types include one or more of the critical alert, the high alert, the medium alert, the low alert, and the notification alert. In an embodiment, the exposure types include at least one of the direct exposure, the indirect exposure, and the small exposure, and the criticality types include the high criticality, the medium criticality, and the normal criticality. According to an embodiment, step 1001 is implemented in the receiving module 301 of FIG. 3.

After receiving the data, the method 1000 at step 1003 includes determining, corresponding to each of the severity levels in each of the plurality of risk parameters, the severity score for the each network asset based on the risk metric, and the severity weightage preassigned corresponding to each of the severity levels. The severity score is determined for each of the plurality of risk parameters for the one or more network assets. In particular, the step 1003 includes determining the severity score corresponding to each of the severity levels for the vulnerabilities, threats, exposure, and criticalities. According to an embodiment, step 1003 is implemented in the risk scoring module 303 of FIG. 3.

In an implementation, for determining the severity score corresponding to each of the severity levels for the vulnerabilities associated with the each network asset, the step 1003 includes comparing the CVSS score of the each network asset with the predefined threshold value, where the CVSS score indicates the severity levels for the vulnerabilities associated with the each network asset. Further, the step 1003 includes determining whether the CVSS score, for the vulnerabilities in the each network asset, is greater or equal to the predefined threshold value based on the comparison. Further, the step 1003 includes determining the severity score corresponding to each of the severity levels associated with the CVSS score by performing a multiplication operation on the determined CVSS score that is greater or equal to the predefined threshold value and the severity weightage that is preassigned corresponding to each of the severity levels associated with the CVSS score.

In an implementation, for determining the severity score corresponding to each of the severity levels for the threats associated with the each network asset, the step 1003 includes performing the multiplication operation on the number of alerts for each of the alert types and the severity weightage that is preassigned corresponding to each of the alert types. Further, the step 1003 includes determining the severity score corresponding to each of the severity levels for the threats associated with the each network asset based on the output of the multiplication operation.

In a further implementation, the step 1003, further determines the severity score corresponding to each of the severity levels for the exposures associated with the each network asset based on the predefined exposure risk factor, the severity weightage that is preassigned corresponding to each of the exposure types, the average amount of traffic in the each network asset.

In yet further implementation the step 1003, further determines the severity score corresponding to each of the severity levels for the criticalities associated with the each network asset based on the predefined criticality factor, the severity weightage that is preassigned corresponding to each of the criticality types, and the number of criticalities for each of the criticality types associated with the each network asset.

Further, at step 1005, the method 1000 includes calculating the risk score for the each network asset with respect to each of the plurality of risk parameters based on the summation of the severity score of each of the plurality of risk parameters.

According to an embodiment, at step 1007, the method 1000 includes calculating the total risk score for the each network asset based on the risk weightage preassigned corresponding to each of the plurality of risk parameters and the summation of the risk score with respect to each of the plurality of risk parameters for the each network asset.

In an embodiment, the steps 1003 to 1007 are implemented at the risk scoring module 303 of FIG. 3.

Further, at step 1009, the method 1000 includes evaluating the risk associated with the each network asset based on the total risk score for the each network asset. In an embodiment, the method 1000 further includes comparing the total risk score for the each network asset with a predefined threshold value. In an embodiment, the step 1009 is implemented in the risk assessment module 305 of FIG. 3.

In an embodiment, the method 1000 further includes displaying, on the graphical user interface (GUI), high-risk network assets among the one or more network assets based on the total risk score for the each network asset that is greater or equal to the predefined threshold value. In an embodiment, the method 1000 further includes displaying, on the GUI, the total risk score along with the risk score for each of the high-risk network assets. In an embodiment, the display operation is performed by the display module 307.

FIG. 11 illustrates a general block diagram of the system, according to an embodiment of the present disclosure. For an example, the processor(s) 1101 may be a single processing unit or a number of units, all of which could include multiple computing units. The processor(s) 1101 may be implemented as one or more microprocessors, microcomputers, microcontrollers, digital signal processors, central processing units, logical processors, virtual processors, state machines, logic circuitries, and/or any devices that manipulate signals based on operational instructions. Among other capabilities, the processor(s) 1101 is configured to fetch and execute computer-readable instructions and data stored in the memory 1103.

The memory 1103 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In an example, the module(s), engine(s), and/or unit(s) 1107 may include a program, a subroutine, a portion of a program, a software component or a hardware component capable of performing a stated task or function. As used herein, the module(s), engine(s), and/or unit(s) may be implemented on a hardware component such as a server independently of other modules, or a module can exist with other modules on the same server, or within the same program. The module(s), engine(s), and/or unit(s) 1107 may be implemented on a hardware component such as processor one or more microprocessors, microcomputers, microcontrollers, digital signal processors, central processing units, state machines, logic circuitries, and/or any devices that manipulate signals based on operational instructions. The module(s), engine(s), and/or unit(s) 1107 when executed by the processor(s) 1101 may be configured to perform any of the described functionalities. According to an embodiment, the module 1107 includes the receiving module 301, the risk scoring module 303, the risk assessment module 305, and the display module 307. In an alternate embodiment, the functions of the aforesaid modules may be performed by the processor(s) 1101.

As a further example, the database 1105 may be implemented with integrated hardware and software. The hardware may include a hardware disk controller with programmable search capabilities or a software system running on general-purpose hardware. Examples of databases are but are not limited to, in-memory databases, cloud databases, distributed databases, embedded databases, and the like. The database amongst other things, serves as a repository for storing data processed, received, and generated by one or more of the processor(s) 1101, and the modules/engines/units 1107.

The modules/engines/units 1107 may be implemented with an AI module that may include a plurality of neural network layers. Examples of neural networks include, but are not limited to, a convolutional neural network (CNN), a deep neural network (DNN), a recurrent neural network (RNN), and a Restricted Boltzmann Machine (RBM). The learning technique is a method for training a predetermined target device using a plurality of learning data to cause, allow, or control the target device to make a determination or prediction. Examples of the learning techniques include, but are not limited to, supervised learning, unsupervised learning, semi-supervised learning, or reinforcement learning. At least one of a plurality of CNN, DNN, RNN, RMB models and the like may be implemented to thereby achieve execution of the present subject matter's mechanism through an AI model. A function associated with the AI model may be performed through the non-volatile memory, the volatile memory, and the processor. The processor may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or the artificial intelligence (AI) model stored in the non-volatile memory and the volatile memory. The predefined operating rule or artificial intelligence model is provided through training or learning.

As an example, the display unit 1109 includes a computer monitor, a touch screen, an output device capable of displaying the graphics, and the like. The display unit 1109 is configured to display visual output in desktops, laptops, and workstations. The display unit 1109 may come in different sizes, resolutions, and types (such as LCD, LED, or OLED).

As a further example, the network interface 1111 is configured to provide and establish communication with any electronic device via a public network, private network, or any wireless communication technology.

The disclosed technique seamlessly integrates into the Continuous Integration (CI) product, requiring minimal setup and configuration, thus ensuring ease of deployment for users. The network asset risk scoring functionality becomes readily available within the CI product's interface upon installation. Further, the users can conveniently access the risk score for each network asset directly from the asset's web UI page. This intuitive user interface design facilitates quick and efficient monitoring of asset security status without the need for extensive training or technical expertise. Further, the users can leverage this information to prioritize security measures, allocate resources effectively, and proactively mitigate potential risks, thereby enhancing overall cybersecurity posture.

The figures of the disclosure are provided to illustrate some examples of the invention described. The figures are not to limit the scope of the depicted embodiments of the appended claims. Aspects of the disclosure are described herein with reference to the invention to example embodiments for illustration. It should be understood that specific details, relationships, and methods are set forth to provide a full understanding of the example embodiments. One of the ordinary skills in the art recognize the example embodiments that can be practiced without one or more specific details and/or with other methods.

Aspects of the present disclosure may be implemented as computer program products that comprise articles of manufacture. Such computer program products may include one or more software components including, for example, applications, software objects, methods, data structure, and/or the like. In some embodiments, a software component may be stored on one or more non-transitory computer-readable media, which computer program product may comprise the computer-readable media with software component, comprising computer executable instructions, included thereon. The various control and operational systems described herein may incorporate one or more of such computer program products and/or software components for causing the various conveyors and components thereof to operate in accordance with the functionalities described herein.

It is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

We claim:

1. A method for evaluating risk associated with one or more network assets, the method comprising:

receiving data associated with the one or more network assets, wherein the data includes at least one of one or more risk identifiers for identifying a plurality of risk parameters associated with each network asset among the one or more network assets and one or more risk metrics associated with the one or more risk identifiers, and the one or more risk metrics indicate severity levels in the each network asset with respect to each of the plurality of risk parameters;

determining, corresponding to each of the severity levels in each of the plurality of risk parameters, a severity score for the each network asset based on the risk metric and a severity weightage preassigned corresponding to each of the severity levels, wherein the severity score is determined for each of the plurality of risk parameters for the one or more network assets;

calculating a risk score for the each network asset with respect to each of the plurality of risk parameters based on a summation of the severity score of each of the plurality of risk parameters;

calculating a total risk score for the each network asset based on a risk weightage preassigned corresponding to each of the plurality of risk parameters and a summation of the risk score with respect to each of the plurality of risk parameters for the each network asset;

evaluating the risk associated with the each network asset based on the total risk score for the each network asset;

comparing the total risk score for the each network asset with a predefined threshold value; and displaying, on a graphical user interface (GUI), high-risk network assets among the one or more network assets, wherein the high-risk network assets are network assets having a total risk score that is greater than or equal to the predefined threshold value, wherein the GUI displays the total risk score along with the risk score for each of the high-risk network assets;

prioritize risk mitigation efforts and allocate resources effectively to address the risks associated with high-risk network assets.

2. The method of claim 1, wherein the plurality of risk parameters comprising at least one of vulnerabilities, exposures, threats, and criticalities associated with the each network asset, and the one or more risk metrics comprises a list of Common Vulnerabilities and Exposures (CVEs), a Common Vulnerability Scoring System (CVSS) score, alert types, a number of alerts for each of the alert types, exposure types, criticality types, a number of criticalities for each of the criticality types for the each network asset.

3. The method of claim 2, further comprising determining the severity score corresponding to each of the severity levels for the vulnerabilities associated with the each network asset, wherein determining the severity score corresponding to each of the severity levels for the vulnerabilities associated with the each network asset comprises:

comparing the CVSS score of the each network asset with a predefined threshold value, wherein the CVSS score indicates the severity levels for the vulnerabilities associated with the each network asset;

determining whether the CVSS score, for the vulnerabilities in the each network asset, is greater or equal to the predefined threshold value based on the comparison; and determining the severity score corresponding to each of the severity levels associated with the CVSS score by performing a multiplication operation on the determined CVSS score that is greater or equal to the predefined threshold value and the severity weightage that is preassigned corresponding to each of the severity levels associated with the CVSS score.

4. The method of claim 2, further comprising:

determining the severity score corresponding to each of the severity levels for the threats associated with the each network asset, wherein determining the severity score corresponding to each of the severity levels for the threats associated with the each network asset comprises:

performing a multiplication operation on the number of alerts for each of the alert types and the severity weightage that is preassigned corresponding to each of the alert types; and determining the severity score corresponding to each of the severity levels for the threats associated with the each network asset based on an output of the multiplication operation.

5. The method of claim 2, further comprising:

determining the severity score corresponding to each of the severity levels for the exposures associated with the each network asset, wherein the severity score, corresponding to each of the severity levels for the exposures associated with the each network asset, is determined based on a predefined exposure risk factor, the severity weightage that is preassigned corresponding to each of the exposure types, an average amount of traffic in the each network asset.

6. The method of claim 2, further comprising:

determining the severity score corresponding to each of the severity levels for the criticalities associated with the each network asset, wherein the severity score corresponding to each of the severity levels for the criticalities associated with the each network asset is determined based on a predefined criticality factor, the severity weightage that is preassigned corresponding to each of the criticality types, and the number of criticalities for each of the criticality types associated with the each network asset.

7. The method of claim 1, wherein receiving data associated with the one or more network assets comprises receiving a first portion from a risk-analyzing platform, a second portion from a threat intelligence platform, and a third portion from a compliance management platform, wherein the risk-analyzing platform, the threat intelligence platform, and the compliance management platform are distinct devices located remotely from each other.

8. The method of claim 1, further comprising:

periodically updating the GUI to display top high-risk network assets among the one or more network assets based on a periodic evaluation.

9. The method of claim 1, wherein network assets among the one or more network assets having a total risk score less than the predefined threshold value are not displayed on the GUI.

10. A system for evaluating risk associated with one or more network assets, the system comprising:

one or more processors;

a memory; and one or more programs stored in the memory, the one or more programs when executed by the one or more processors cause the one or more processors to:

receive data associated with the one or more network assets, wherein the data includes at least one of one or more risk identifiers for identifying a plurality of risk parameters associated with each network asset among the one or more network assets and one or more risk metrics associated with the one or more risk identifiers, and the one or more risk metrics indicate severity levels in the each network asset with respect to each of the plurality of risk parameters;

determine, corresponding to each of the severity levels in each of the plurality of risk parameters, a severity score for the each network asset based on the risk metric and a severity weightage preassigned corresponding to each of the severity levels, wherein the severity score is determined for each of the plurality of risk parameters for the one or more network assets;

calculate a risk score for the each network asset with respect to each of the plurality of risk parameters based on a summation of the severity score of each of the plurality of risk parameters;

calculate a total risk score for the each network asset based on a risk weightage preassigned corresponding to each of the plurality of risk parameters and a summation of the risk score with respect to each of the plurality of risk parameters for the each network asset;

evaluate the risk associated with the each network asset based on the total risk score for the each network asset;

compare the total risk score for the each network asset with a predefined threshold value; and display, on a graphical user interface (GUI), high-risk network assets among the one or more network assets, wherein the high-risk network assets are network assets having a total risk score that is greater than or equal to the predefined threshold value, wherein the GUI displays the total risk score along with the risk score for each of the high-risk network assets;

prioritize risk mitigation efforts and allocate resources effectively to address the risks associated with high-risk network assets.

11. The system of claim 10, wherein the plurality of risk parameters comprising at least one of vulnerabilities, exposures, threats, and criticalities associated with the each network asset, and the one or more risk metrics comprises a list of Common Vulnerabilities and Exposures (CVEs), a Common Vulnerability Scoring System (CVSS) score, alert types, a number of alerts for each of the alert types, exposure types, criticality types, a number of criticalities for each of the criticality types for the each network asset.

12. The system of claim 11, wherein the one or more processors are configured to determine the severity score corresponding to each of the severity levels for the vulnerabilities associated with the each network asset, wherein the one or more processors are configured to:

compare the CVSS score of the each network asset with a predefined threshold value, wherein the CVSS score indicates the severity levels for the vulnerabilities associated with the each network asset;

determine whether the CVSS score, for the vulnerabilities in the each network asset, is greater or equal to the predefined threshold value based on the comparison; and determine the severity score corresponding to each of the severity levels associated with the CVSS score by performing a multiplication operation on the determined CVSS score that is greater or equal to the predefined threshold value and the severity weightage that is preassigned corresponding to each of the severity levels associated with the CVSS score.

13. The system of claim 11, wherein the one or more processors are configured to:

determine the severity score corresponding to each of the severity levels for the threats associated with the each network asset, wherein determining the severity score corresponding to each of the severity levels for the threats associated with the each network asset comprises:

perform a multiplication operation on the number of alerts for each of the alert types and the severity weightage that is preassigned corresponding to each of the alert types; and determine the severity score corresponding to each of the severity levels for the threats associated with the each network asset based on an output of the multiplication operation.

14. The system of claim 11, wherein the one or more processors are configured to:

determine the severity score corresponding to each of the severity levels for the exposures associated with the each network asset, wherein the severity score, corresponding to each of the severity levels for the exposures associated with the each network asset, is determined based on a predefined exposure risk factor, the severity weightage that is preassigned corresponding to each of the exposure types, an average amount of traffic in the each network asset.

15. The system of claim 11, wherein the one or more processors are configured to:

determine the severity score corresponding to each of the severity levels for the criticalities associated with the each network asset, wherein the severity score corresponding to each of the severity levels for the criticalities associated with the each network asset is determined based on a predefined criticality factor, the severity weightage that is preassigned corresponding to each of the criticality types and the number of criticalities for each of the criticality types associated with the each network asset.

16. The system of claim 11, wherein the number of alerts includes at least one of a number of critical alerts, a number of high alerts, a number of medium alerts, a number of low alerts, and a number of notification alerts for each of the alert types.

17. The system of claim 11, wherein the alert types include one or more of a critical alert, a high alert, a medium alert, a low alert, and a notification alert, the exposure types include at least one of a direct exposure, an indirect exposure, and a small exposure, and the criticality types include a high criticality, a medium criticality, and a normal criticality.

18. A non-transitory computer-readable storage medium storing program instructions for evaluating risk associated with one or more network assets, the program instructions, when executed, perform the steps of:

receiving data associated with the one or more network assets, wherein the data includes at least one of one or more risk identifiers for identifying a plurality of risk parameters associated with each network asset among the one or more network assets and one or more risk metrics associated with the one or more risk identifiers, and the one or more risk metrics indicate severity levels in the each network asset with respect to each of the plurality of risk parameters;

determining, corresponding to each of the severity levels in each of the plurality of risk parameters, a severity score for the each network asset based on the risk metric and a severity weightage preassigned corresponding to each of the severity levels, wherein the severity score is determined for each of the plurality of risk parameters for the one or more network assets;

calculating a risk score for the each network asset with respect to each of the plurality of risk parameters based on a summation of the severity score of each of the plurality of risk parameters;

calculating a total risk score for the each network asset based on a risk weightage preassigned corresponding to each of the plurality of risk parameters and a summation of the risk score with respect to each of the plurality of risk parameters for the each network asset;

evaluating the risk associated with the each network asset based on the total risk score for the each network asset;

comparing the total risk score for the each network asset with a predefined threshold value; and displaying, on a graphical user interface (GUI), high-risk network assets among the one or more network assets, wherein the high-risk network assets are network assets having a total risk score that is greater than or equal to the predefined threshold value, wherein the GUI displays the total risk score along with the risk score for each of the high-risk network assets;

prioritize risk mitigation efforts and allocate resources effectively to address the risks associated with high-risk network assets.

* * * * *